United States Patent Office 3,553,222
Patented Jan. 5, 1971

3,553,222
PROCESS FOR THE PRODUCTION OF PYRIDINE AND ALKYL-DERIVATIVES OF PYRIDINE BY MEANS OF THERMAL HYDRODEALKYLATION OF HIGHER ALKYL AND ALKENYL PYRIDINES
Adriano Nenz, Romano Covini, Marcello Pieroni, and Jean Herzenberg, Milan, Italy, assignors to Montecatini Edison S.p.A., Milan, Italy
No Drawing. Continuation of application Ser. No. 506,110, Nov. 2, 1965. This application Aug. 21, 1968, Ser. No. 755,509
Claims priority, application Italy, Nov. 11, 1964, 24,169/64
Int. Cl. C07d *31/00*
U.S. Cl. 260—290     6 Claims

ABSTRACT OF THE DISCLOSURE

Pyridine and alkyl derivatives of pyridine are produced by hydrodealkylation of higher alkyl and alkenyl pyridines at a temperature of from 625 to 900° C., under a pressure of between 5 and 60 atm. and in the presence of molecular hydrogen and a sulfurated compound such as carbon disulfide or hydrogen sulfide present in such quantities that the ratio by weight between the sulphur contained in the sulfurated compound and the derivatives of pyridine is between 0.005:100 and 5:100, and preferably between 0.01:100 and 1:100.

---

This application is a continuation of our prior co-pending application Ser. No. 506,110, filed Nov. 2, 1965, and now abandoned.

The present invention relates to a process for the production of pyridine and alkylpyridine by thermal hydrodealkylation of higher homologues or more highly substituted alkyl and alkenyl derivatives of pyridine.

Processes for hydrodealkylation of alkyl homologues of pyridine are known, e.g., 2-picoline is dealkylated under atmospheric pressure in the presence of catalysts composed of nickel or cobalt and molybdenum.

These known processes for catalytic hydrodealkylation give rise to low yields of useful products. Furthermore the catalysts quickly become inactive owing to the deposition of a large quantity of coal products formed during the decomposition of the alkylpyridines.

Processes for the thermal hydrodealkylation of alkylpyridine at atmospheric pressure are also known. Such processes are carried out in reactors made of inert material such as quartz or in metallic reactors. When the reactor is metallic the reaction occurs in the presence of large quantities of sulfur or selenium compounds.

The main disadvantage of these processes again is low yields. By employing high quantities of sulfurated compounds in these processes, a rapid corroding of the metallic reactor and the forming of sulfurated products of complex nature occur. These products cannot be separated by the following fractional distillation and thus give rise to colored and odoriferous pyridic bases.

Should thermal hydrodealkylation of alkylderivatives of pyridine take place in a metallic reactor under high pressure and in the absence of sulfurated compounds, the process gives rise to a progressive deposit of coal products on the reactor walls; said coal products forming as a consequence of secondary reactions of the pyridic ring cracking.

It is an object of the present invention to provide an easily workable process for the production of pyridine and alkylderivatives thereof with good yields, and a high degree of purity and without the drawbacks inherent in the known processes.

According to the present invention, pyridine and alkyl derivatives thereof are obtained by dealkylating higher homologues or more highly substituted alkyl and alkenyl derivatives of pyridine with molecular hydrogen, at temperatures in the range of from 625–900° C., at pressure between 5 and 60 atm. in the presence of sulfurated compounds such as carbon disulfide or hydrogen sulfide and in such quantities that the ratio by weight between the sulphur contained in the sulfurated compound and pyridine derivative starting product lies in the range from 0.005:100 and 5:100, and preferably in the range of from 0.01:100 and 1:100.

Employing the process of the present invention, all the alkyl and alkenyl derivatives of pyridine may be dealkylated with excellent yields, more particularly 2-methyl-5-ethylpyridine can be used to advantage in obtaining pyridine and 2-picoline with excellent yields. A useful starting material is 2-methyl-5-ethylpyridine since it can be easily synthetized and economically purchased.

The process of the present invention can be profitably employed to treat a mixture of pyridic bases obtained as by-product in the synthesis of 2-methyl-5 ethylpyridine when using as starting materials aldehydes and ammonia and having a boiling point range higher than the boiling point of 2-methyl-5 ethylpyridine. Heretofore, these mixtures of pyridic bases, formed in great quantities in the synthesis of 2-methyl-5 ethylpyridine, and no useful utilization and could not be eliminated with the waste waters owing to their toxicity.

The composition of these mixtures has not yet been completely clarified. However, it has been ascertained that they contain an abundance of alkyl and alkenyl derivatives of pyridine.

Moreover, the process of the present invention is applicable to the fractions of pyridic bases obtained during coal tar distillation and which have a boiling range higher than the pyridic boiling point.

From these technical fractions of pyridic bases which have little commercial value, at present only the three picolines are partially separated for industrial utilization. The process of the present invention permits a better exploitation of the higher pyridic bases contained in these fractions, by converting them mainly into pyridine and alpha-picoline. Pyridine and alpha-picoline have greater economic value.

According to the present invention, it has been found that pressures lying in the range of from 5 and 60 atm. and perferably from 15 and 45 atm. increase unforeseeably the total yields in useful dealkylated products while avoiding secondary reactions which cause the pyridic ring to crack. Besides it promotes the formation of pyridine to the substantial exclusion of picolines and other products of partial dealkylation which have minor commercial importance. Moreover, the use of pressure permits directing the reaction towards the formation of the pyridic bases which from case to case are required. With pressure the dealkylation operates at relatively low temperatures while maintaining a high degree of conversion.

It also has been found that the use of atmospheric pressure as well as pressures higher than 60 atm. promotes reactions which involve pyridic ring cracking with a consequent formation of resinous or coal products. When employing only atmospheric pressure in the hydrodealkylation of 2-methyl-5-ethylpyridine an unwanted side reaction of dehydrogenation with subsequent formation of 2-methyl-5-vinylpyridine is observed.

According to the present invention, alkyl and alkenyl derivatives of pyridine are dealkylated in a metallic reactor at from 5 to 60 atmospheres of pressure in the presence of small quantities of sulfurated compounds, such as carbon disulfide or hydrogen sulfide. The use of such compounds lowers the degree to which side reactions occur which cause the cracking of pyridine derivatives with the formation of coal residuals and subsequent quick occlusion of the reactor.

With the employment of sulfurated compounds it is absolutely necessary to use e.g. carbon disulfide or hydrogen sulfide, in very low ratios and in relation to the quantity of alkylpyridine fed in the reactor, in order to avoid both quick reactor corrosion and the formation of complex sulfurated compounds which are separated with difficulty from the reaction products.

For 1000 g. of 2-methyl-5-ethylpyridine there was 0.63 g. of carbon disulfide dissolved therein.

The reaction conditions and results are indicated in Table 1.

TABLE 1

| Example | 2 | 3 | 4 | 5 | 6 |
|---|---|---|---|---|---|
| Reaction conditions: | | | | | |
| Temperature, °C | 730 | 715 | 655 | 685 | 685 |
| Pressure atm | 15 | 30 | 30 | 15 | 60 |
| Total residence time, sec | 3.9 | 7.3 | 9.0 | 3.9 | 15.5 |
| Conversion, percent | 99.4 | 99.6 | 71.3 | 83.7 | 99.6 |
| Yields with respect to the converted material in mol percent: | | | | | |
| Pyridine | 50.3 | 57.9 | 18.9 | 24.5 | 52.8 |
| 2-picoline | 19.1 | 9.3 | 37.2 | 35.8 | 9.2 |
| 3-picoline | 5.7 | 2.6 | 4.9 | 5.9 | 2.5 |
| 3-ethylpyridine | 1.5 | 0.4 | 20.9 | 15.4 | 1.1 |
| 2,5-lutidine | 2.5 | 0.7 | 8.7 | 7.6 | 0.9 |

The ratio by weight between the sulfur contained in the sulfurated compound and the alkyl and alkenyl derivatives of pyridine must be in the range of from 0.005:100 and 5:100 and preferable between 0.01:100 and 1:100. Quantities of sulfurated compounds in range higher than the above-mentioned ones, cause the formation of complex sulfurated derivatives which upon fractional distillation, cannot be separated from the pyridic bases thus produced. This inability to separate out the sulfurated compounds causes the introduction of color and odor to the pyridic bases. Such quantities of sulfurated compounds also cause the metallic reactor to corrode thus preventing an industrial application of the process.

In the following examples will be found specific embodiments of the invention and details employed in the practice of the invention.

EXAMPLE 1

2-methyl-5-ethylpyridine to which carbon disulfide was added at the rate of 0.63 g. per 1000 g. was gradually vaporized and fed simultaneously with a stream of hydrogen into a stainless steel reactor filled with ceramic material. The rate at which hydrogen and 2-methyl-5-ethylpyridine are fed is such as to produce a molar ratio of $H_2$ to 2-methyl-5-ethylpyridine of 14.

At the reactor outlet, the gaseous mixture was cooled and condensed by a cooling bath. The condensed liquid products were then fractionally distilled.

Pyridine, 2-picoline and a mixture of 3-picoline, 3-ethylpyridine and 2,5-lutidine, were isolated and analyzed by chromatography in vapor phase.

The reaction conditions and results thus obtained are as follows:

Reaction conditions:
  Inner reactor temperature—685° C.
  Pressure—45 atm.
  Total residence time—11 sec.
  Conversion of 2-methyl-5-ethylpyridine—98.3%

Yields with respect to the converted material in mol percent:

Pyridine _____ 55.0
2-picoline _____ 15.5
3-picoline _____ 3.7
3-ethylpyridine _____ 2.9
2,5-lutidine _____ 1.2

EXAMPLES 2–6

A series of tests was carried out demonstrating the possibility of directing the process towards the production of pyridine or 2-picoline. The process was performed in accordance with the conditions of Example 1. The molar ratio of hydrogen to 2-methyl-5-ethylpyridine was 14:1.

EXAMPLE 7

The process was performed in accordance with the conditions of Example 1. Into a stainless steel reactor full of ceramic beads, a mixture of hydrogen and 2-methyl-5-ethylpyridine was allowed to pass, the molar ratio being 16:1.

2-methyl-5-ethylpyridine had been previously added with hydrogen sulfide at the rate of 0.53 g. of $H_2S$ per 1000 g. of 2-methyl-5-ethylpyridine.

The reaction conditions and results are as follows:

Inner reactor temperature—715° C.
Pressure—30 atm.
Total residence time—7 sec.
Conversion of 2-methyl-5-ethylpyridine—100%

Yields with respect to the converted material in mol percent:

Pyridine _____ 58.8
2-picoline _____ 9.9
3-picoline _____ 2.8
3-ethylpyridine _____ 0.5
2,5-lutidine _____ 0.8

By comparing these results with those of Table 1, Example 3, it will be noticed that hydrogen sulphide behaves in substantially the same manner as does carbon disulfide.

EXAMPLE 8

A test for hydrodealkylation of 2-methyl-5-ethylpyridine was carried out in a stainless steel reactor filled with ceramic beads according to Example 1. In this case no sulfurated compound was used.

The results and reaction conditions are as follows.

Reaction conditions:
  Inner reactor temperature—735° C.
  Pressure—15 atm.
  Total residence time—3.6 sec.
  Molar ratio $H_2$/2-methyl-5-ethylpyridine—16
  Conversion of 2-methyl-5-ethylpyridine—100%

Yield with respect to the converted material in mol percent:

Pyridine _____ 51.5
2-picoline _____ 8.4
3-picoline _____ 2.9
2,5-lutidine _____ 1.0

During the reaction the remarkable quantities of coal products were deposited on the reactor walls with a consequent decrease in total yields with respect to the dealkylated pyridic bases. This is obvious by comparing the results of this example with Example 2.

EXAMPLES 9 AND 10

Hydrogen and vaporized 2-methyl-5-ethylpyridine in a molar ratio 12:1 were introduced at atmospheric pressure into a reactor formed from a quartz pipe filled with ceramic beads. At the reactor outlet, the reaction mixture is condensed and the liquid thus obtained separated by fractional distillation into 3 fractions consisting respectively of pyridine, 2-picoline and a mixture of 3-picoline, 3-ethyl-pyridine, 2,5-lutidine and 2-methyl-5-vinylpyridine. Their composition was determined by chromatography.

The reaction conditions and results thus obtained are reported in Table II.

TABLE II

| Example | 9 | 10 |
|---|---|---|
| Reaction conditions: | | |
| Inner reactor temperature, °C | 810 | 880 |
| Total residence time, sec | 0.25 | 0.2 |
| 2 methyl 5 ethylpyridine conversion | 99.5 | 100 |
| Yields with respect to the converted material in mol percent: | | |
| Pyridine | 23.3 | 32.3 |
| 2 picoline | 32.2 | 22.6 |
| 3 picoline | 8.1 | 5.8 |
| 3 ethylpyridine | 0.6 | 0 |
| 2,5 lutidine | 12.0 | 5.0 |
| 2 methyl 5 vinylpyridine | 6.0 | 1.0 |

The two above mentioned examples, when compared with Examples 1–7, clearly show the advantages resulting from operating at a pressure higher than atmospheric.

EXAMPLES 11–13

A mixture of high boiling pyridic bases, obtained as byproducts in the synthesis of 2-methyl-5-ethylpyridine from paraldehyde and ammonia in liquid phase was subjected to hydrodealkylation.

This mixture, consisting of products formed during the synthesis, has a boiling range higher than the boiling point of 2-methyl-5-ethylpyridine (B.P. 178° C. at 760 mm. Hg). A part of this mixture cannot be distilled.

Examples 11–13 refer to the hydrodealkylation of the above mentioned mixture comprising: the mixture as it is, a fraction distilling up to 145° C. at the pressure of 5 mm. Hg and corresponding to 38.5% by weight of the total mixture, and a fraction distilling up to 246° C. at the pressure of 5 mm. Hg and corresponding to 63% by weight of the total mixture, respectively. In a stainless steel reactor filled with ceramic beads the mixtures of pyridic bases with carbon disulfide in a quantity of 0.63 g. of carbon disulfide per 1000 g. of the mixtures were fed contemporaneously with a stream of hydrogen. At the reactor outlet, the gaseous mixture is cooled and condensed. Then, the condensed liquid products were subjected to fractional distillation for collecting pyridine, 2-picoline and 3-picoline. The reaction conditions and results are indicated in Table III.

TABLE III

| | Example 11 | Example 12 | Example 13 |
|---|---|---|---|
| Reaction conditions: | | | |
| Temperature, °C | 720 | 720 | 727 |
| Pressure, atm | 30 | 30 | 30 |
| Ratio $H_2$/feeding mixture g./kg. | 460 | 440 | 320 |
| Space velocity [kg. per liter of intergranular space in the reactor per hour] | 1.42 | 1.38 | 1.38 |
| Products obtained in percent by weight with respect to the fed product: | | | |
| Pyridine | 3.2 | 17.0 | 10.6 |
| 2 picoline | 4.2 | 5.0 | 5.4 |
| 3 picoline | 1.9 | 2.7 | 2.9 |

The product obtained by hydrodealkylation of Example 13, was recycled after having recovered pyridine, 2-picoline and 3-picoline.

Operating in accordance with the procedure of Example 13, the following yields were obtained: pyridine 3.9%, 2-picoline 2.7%, 3-picoline 2.2% by weight based upon the product sent to the recycle.

EXAMPLE 14

A fraction of pyridic bases obtained by coal tar distillation, was subjected to hydrodealkylation. Of this fraction 95% boils under 160° C., with the pyridine and 2-picoline content being respectively, 1.4% and 19.8% by weight. To this fraction was added with carbon disulfide in a quantity of 0.63 g. per 1000 g. of bases. Then it was vaporized and fed together with hydrogen in a steel reactor filled with ceramic beads maintained at a temperature of 700° C. and the pressure of 45 atm. Hydrogen was fed according to a ratio by weight of 220 g. of hydrogen per 1000 g. of pyridic bases. The space velocity of the pyridic bases is 0.81 (kg. per liter of intergranular space in the reactor per hour). The pyridic bases contained in the reaction gaseous mixture were condensed, collected and then fractionally distilled; pyridine and 2-picoline being separated. Pyridine constituted 32.8% by weight of the gaseous feed. 2-picoline constituted 13.5% by weight of said feed while the total bases were about 62% by weight of said feed.

EXAMPLES 15–17

The same fraction of pyridic bases employed in Example 14 excluding pyridine and 2-picoline which were eliminated by distilaltion, was subjected to hydrodealkylation. The feed constituted 72% by weight of the total fraction. The process was carried out as set forth in Example 14. Pyridine and 2-picoline were separated by distillation from the resultant pyridic bases. The reaction conditions and results thus obtained are indicated in Table IV:

TABLE IV

| | Example 15 | Example 16 | Example 17 |
|---|---|---|---|
| Reaction conditions: | | | |
| Temperature, °C | 700 | 670 | 713 |
| Pressure atm | 45 | 60 | 45 |
| Ratio $H_2$/bases in g./kg | 220 | 220 | 220 |
| Ratio $CS_2$/bases in g./kg | 0.63/1,000 | 0.63/1,000 | 0.63/1,000 |
| Space velocity [kg. per liter of intergranular space in the reactor per hour] | 0.87 | 0.88 | 0.84 |
| Obtained products, percent by weight with respect to the feed: | | | |
| Pyridine | 33.0 | 27.4 | 36.4 |
| 2-picoline | 12.4 | 14.6 | 5.1 |
| Total bases | 67 | 70 | 48 |

EXAMPLE 18

Pyridine and 2-picoline were recovered by distillation from the condensed material of a preceding hydrodealkylation, carried out on a technical fraction of pyridic bases obtained by coal tar distillation. The distillation residue did not contain pyridine while the content of 2-picoline was 0.4% by weight of said residue. This residue was again subjected to hydrodealkylation at 695° C. and 45 atm. The other reaction conditions were:

space velocity: 0.73 (kg. per liter of intergranular space in the reactor per hour)

ratio carbon disulfide/starting pyridic bases 0.63 g. of carbon disulfide per 1000 g. of pyridic bases.

ratio $H_2$/starting pyridic bases 273 g. of $H_2$ per 1000 g. of pyridic bases.

From the fractional distillation of the reaction products pyridine and 2-picoline were obtained in amount of 21% and 4.9% by weight respectively, based on the starting product.

EXAMPLE 19

A fraction of pyridic bases, obtained by coal tar distillation, 90% by volume of which boils between 165° and 235° C. and free of pyridine and 2-picoline, was subjected to hydrodealkylation. The process was carried out in a stainless steel reactor filled with ceramic beads in accordance with the procedure of Example 14. The reaction conditions were as follows:

ratio carbon disulfide/pyridic bases of 0.63 g. of carbon disulfide per 1000 g. of pyridic bases ratio $H_2$/pyridic bases of 248 g. of $H_2$ per 1000 g. of pyridic bases reaction temperature 700° C.

pressure 45 atm.

space velocity 830 (kg. per liter of intergranular space in the reactor per hour)

After condensation and fractional distillation of reaction products, a yield of pyridine and picoline respectively of 14.7% and 7.6% by weight with respect to the pyridic bases was obtained.

As many widely differing changes may be made without departing from the spirit and scope of this invention, it is to be understood that said invention is in nowise restricted save as set forth in the appended claims.

What is claimed is:

1. In a hydrodealkylating process for the production of pyridine and picolines from a starting material consisting of higher homologues of pyridine in the presence of molecular hydrogen and sulfurated compounds selected from the group consisting of carbon disulfide and hydrogen sulfide, the improvement which consists in carrying out the hydrodealkylating reaction in a stainless steel reactor under a pressure of 5 to 60 atm. at a temperature in the range of from 625 to 900° C., and the ratio by weight between the sulfur contained in the sulfurated compound and said starting material being between 0.005:100 and 5:100.

2. The process of claim 1, wherein the starting material is comprised of 2-methyl-5-ethylpyridine.

3. The process of claim 1, wherein said starting material is a mixture of pyridic bases obtained as by-products of the synthesis of 2-methyl-5-ethylpyridine from aldehydes and ammonia in liquid phase, said mixture having a boiling range higher than the boiling point of 2-methyl-5-ethylpyridine.

4. The process of claim 1, wherein said starting material is a mixture of pyridic bases obtained from coal tar distillation, said mixture having a boiling point range higher than the boiling point of pyridine.

5. The process of claim 1, wherein the ratio by weight between the sulfur contained in said sulfurated compound and said starting material is between 0.01:100 and 1:100.

6. The process of claims 1, 2 or 5, wrerein the reaction is carried out under a pressure of 15 and 45 atm.

References Cited

Amemiya et al. (I), Coal Tar 4:183–7 (1952); abstracted in C.A. 46:8830 (1952).

Amemiya et al. (II), Japan 4578 (Nov. 6, 1952); abstracted in C.A. 47:11260 (1953).

Klingsberg, Pyridine and Its Derivatives (Interscience, N.Y., 1961), pages 182–4.

HENRY R. JILES, Primary Examiner

C. M. SHURKO, Assistant Examiner